Sept. 7, 1954 A. E. HANSON 2,688,499
HOSE FAUCET CONNECTION
Filed Aug. 22, 1950
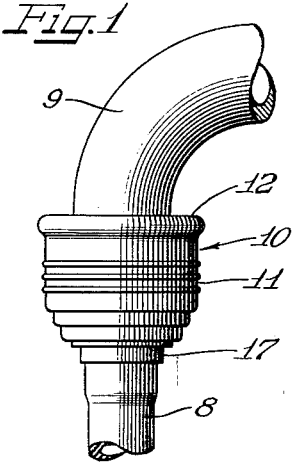
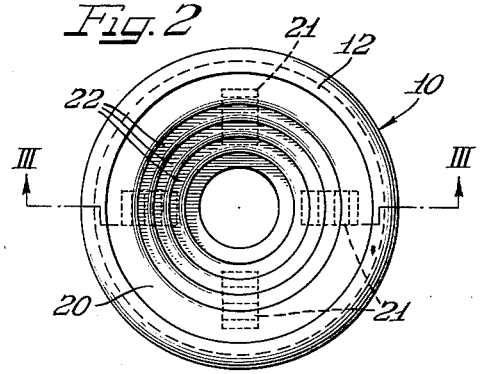
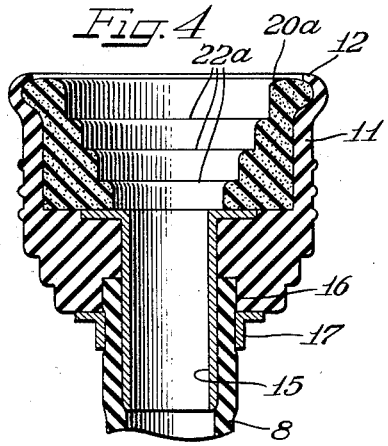
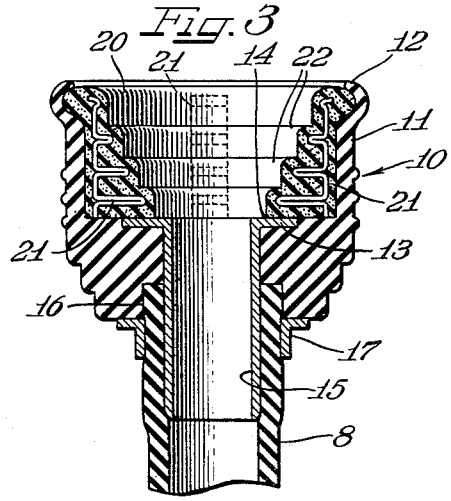
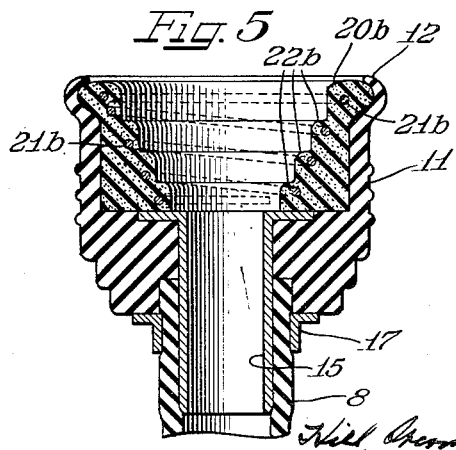
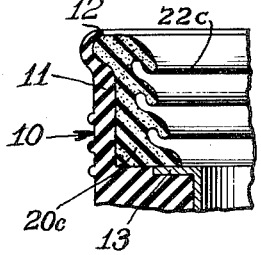
Inventor
Arnold E. Hanson
by
Attys

Patented Sept. 7, 1954

2,688,499

UNITED STATES PATENT OFFICE 2,688,499

HOSE FAUCET CONNECTION

Arnold E. Hanson, Evanston, Ill.

Application August 22, 1950, Serial No. 180,807

5 Claims. (Cl. 285—90)

This invention relates to a faucet connection and more particularly to one which will frictionally engage and grip an end of the faucet without requiring the use of any supplemental fastening means.

An object of this invention is to provide a faucet connection of rubber or rubber like material, such as synthetic plastics, which will better grip an end of a faucet from the standpoint of adhering thereto in the use of the connection.

Another object of this invention is to provide a faucet connection especially adapted for use in connecting hose and the like to the faucet, such as is employed in hand sprays and the like.

In accordance with the general features of this invention there is provided a faucet connection including an outer casing of relatively hard rubber like or plastic material having a dished opening at the inlet end and communicating with an outlet in the casing for connection with the hose. The dished end of the casing has an insert of comparatively softer resilient or spongy material with a stepped frusto-conical bore for receiving the faucet end therein and provided with yieldable shoulders for frictionally gripping the faucet extremity.

Other features of the invention relate to the reinforcing of the shoulders of the spongy insert with means embedded in the spongy insert.

Other objects and features of this invention will more fully appear from the following detailed description taken in connection with the accompanying drawing which illustrates several embodiments thereof and in which:

Figure 1 is a fragmentary elevational view showing my connection in use between a faucet and a hose;

Figure 2 is a plan view of one form of my novel faucet connection;

Figure 3 is a cross-sectional view taken on the line III—III of Figure 2 looking in the direction indicated by the arrows and showing the connection for the hose attached thereto;

Figure 4 is a cross-sectional view similar to Figure 3 showing a modification of the invention wherein the spongy insert is not reinforced;

Figure 5 is a cross-sectional view similar to Figure 3 showing a further modification wherein a spiral spring is embedded in the spongy insert for reinforcing the same; and Figure 6 is a cross-sectional view of a still further modification of the invention.

As shown on the drawing:

The reference character 10 designates generally one form of a connection embodying this invention which is adapted to establish a connection between a faucet end or nozzle 9 to a rubber or plastic hose 8, such as is used in connection with sprays and the like.

The connection 10 comprises a tubular body or casing 11 which may be made of a molded composition, such as a rubber like material or a synthetic plastic substitute for rubber. This body 11 is tubular and has a turned undercut lip 12 at its inlet end.

The inlet end of the body 11 is enlarged and at the bottom of the enlargement, as indicated at 13, is an annular recess in which is embedded a flange 14 of a metal sleeve or tube 15 in the bore of the body 11 at the outlet end.

The sleeve 15 projects beyond the body 11 and is adapted to have tightly fitted over it an end of the hose 8 which fits into a counterbored portion 16 at the outlet end of the body or casing. A metal ring 17 is tightly fitted over the hose 8 for clamping it to the tube and for firmly holding the tube and body 11 together.

Seated in the inlet end of the body 11 underneath the lip 12 is a relatively soft resilient spongy tubular insert 20 which is made of considerably softer material than that of the body or casing 11. This insert is wedged into position between the overhanging lip 12 and the bottom of the enlarged portion of the bore of the body 11 and over the flange 14 of the metal tube 15. In other words, it is disposed in the cupped inlet end of the connector. It may be made of a sponge rubber or a synthetic plastic substitute for the same.

This insert 20 has embedded in it, in the first form of the invention, metal reinforcements 21 each comprising a multiplicity of folds of metal located at concentric annular shoulders 22 on the inner surface of the insert. While any suitable number of these reinforcements may be used, I have shown four of them in the illustrated embodiment (Figure 2).

In reality, the center bore of the spongy insert 20 is of frusto-conical shape with spaced concentric shoulders which decrease in diameter toward the outlet end 16 of the body bore. The purpose of the inserts 21 is to strengthen the soft rubber or spongy material at the shoulders and to assist in the gripping action to be exerted by the element 20 on the faucet end 9. The overhanging lip 12 at the inlet end also assists in preventing displacement of the insert element 20 which is tightly wedged or fitted in the enlarged inlet bore of body 11.

In the use of this device, the connector 10 with the hose 8 attached thereto is brought into alignment with the faucet 9 so that it can enter the generally frusto-conical bore of the spongy insert 20. Then the connector may be positioned or twisted onto the end of the faucet with the faucet telescoping the same. In the application of the connector to the faucet, the resiliently yieldable insert 20 accommodates itself to the exterior shape or contour of the faucet and will resiliently yield so as to tightly and frictionally grip the faucet.

While I have found it desirable to reinforce the annular shoulders of the spongy insert 20, it is possible to use a material in the insert which would not require such reinforcing. To this end, in Figure 4, I have shown an insert 20a with shoulders 22, mounted in the body or casing 11 in place of the insert 20. With this exception, these two forms of the invention are identical and therefore like numerals are employed to designate corresponding parts in the two illustrations.

In Figure 5 the connector, with the exception of the spongy insert, is identical to the one shown in Figure 3, and for that reason like numerals in these two figures designate corresponding parts.

However, in this form of Figure 5, I have substituted for the insert 20 a resilient spongy insert 20b having embedded therein a spiral spring 21b with its convolutions approximately aligned with concentric interior shoulders 22b of the insert. This spring, like the shoulders, is disposed about the axis of the tubular body 11 and that of the outlet tube 15.

As in the first form, the spring 21b serves to reinforce the rubber or spongy material of the insert at the shoulders so that the material will not be unduly displaced in the act of pushing or twisting the connector onto the end of the faucet.

The form of the invention shown in Figure 6 is identical to the one shown in Figure 4 with the exception of the construction of the rubber insert 20c which is provided with undercut annular shoulders or lips 22c. Each is adapted to yield, in use, into the groove behind the lip.

According to this form of the invention, as in the previous forms, the connection will accommodate itself to different shapes and sizes of faucet nozzles due to the yielding of the rubber plastic material inside the connection. In this case the undercut or goose neck shoulders 22c will yield as the faucet end enters the connection so as to tightly grip the faucet.

While I have shown these undercut annular shoulders in this form as being part of an insert, they could be mounted integral with the outer case or body 11 if that was so desired and could be of any desired number.

It will be understood that modifications and variations may be effected without departing from the scope of the novel concepts of the present invention.

I claim as my invention:

1. As an article of manufacture, a faucet connection comprising a tubular body having inlet and outlet ends, the inlet of said body being dished with a flange like outer lip extending inwardly therein, a tubular element of relatively soft resilient spongy material tightly wedged in said dished end and under said lip for retention in the outlet end of said body, said element having an inner bore of generally frusto-conical shape and which is progressively stepped to provide concentric circular shoulders of decreasing diameter toward the outlet end and with the greatest opening at the outer end of said dished element, said inner bore comprising a first generally axially extending portion adjacent the inlet, a first generally radially extending portion contiguous with said first axially extending portion contiguous with said first radially extending portion contiguous with said second axially extending portion and facing said inlet, said shoulders being yieldable upon the insertion of a faucet end therein to conform the element to the contour of the faucet and to retainingly and frictionally grip the nozzle, further characterized by the inserted element having embedded therein reinforcing metal strips spaced about the axis of the bore of the element and each being made of a plurality of spaced folded portions progressively lengthening toward the outlet to conform with the progressive increase in section of the material of said element.

2. As an article of manufacture, a faucet connection comprising a tubular body having inlet and outlet ends, the inlet of said body being dished with a flange like outer lip extending inwardly therein, a tubular element of relatively soft resilient spongy material tightly wedged in said dished end and under said lip for retention in the outlet end of said body, said element having an inner bore of generally frusto-conical shape and which is progressively stepped to provide concentric circular shoulders of decreasing diameter toward the outlet end and with the greatest opening at the outer end of said dished element, said inner bore comprising a first generally axially extending portion adjacent the inlet, a first generally radially extending portion contiguous with said first axially extending portion contiguous with said first radially extending portion contiguous with said second axially extending portion and facing said inlet, said shoulders being yieldable upon the insertion of a faucet end therein to conform the element to the contour of the faucet and to retainingly and frictionally grip the nozzle, further characterized by the inserted elements having imbedded therein reinforcements at substantially each of the shoulders of said element.

3. As an article of manufacture, a faucet connection comprising a circular body of relatively hard rubber like material, said body being cupped at one end to define the inlet and having a bore at its other end defining the outlet and in communication with the cupped end, a metal reinforcing sleeve in said bore with an annular flange embedded in the bottom of the cupped end, said body being countersunk about said sleeve for receiving the end of a hose telescopingly applied over the outer end of the sleeve, and an insert of relatively soft resilient spongy material disposed in said cupped end with a generally frusto-conical shaped bore with its smallest end innermost and communicating with the inner end of the sleeve, said insert bore being provided with a plurality of concentric annular shoulders arranged in step form with the shoulder of smallest diameter adjacent the inner end of said sleeve and with the shoulder of greatest diameter at the outer end of the inlet for receiving a faucet extremity therein, said insert bore comprising a first generally axially extending portion adjacent the inlet, a first generally radially extending portion contiguous with said first axially extending portion and facing said inlet, a second generally axially extending portion contiguous with said first radially extending portion, and a second generally radially extending portion contiguous with said second axially extending portion and facing said inlet.

4. The article of claim 3 further characterized by said insert having embedded therein metal reinforcement at each of the step like shoulders.

5. As an article of manufacture, a fucet connection comprising a tubular body with a frusto-conical inlet at one end terminating at its reduced side in an outlet leading from the other end of the body, said frusto-conical inlet being defined by a tubular insert of relatively soft spongy resilient material wedged in the body at the inlet side and having spaced annular shoulders on its inner bore progressively decreasing in diameter toward the outlet of the body, said shoulders extending generally radially and facing said inlet, and each of said shoulders of said insert being backed up by a metal rigidifying means embedded in the material of the insert at the shoulder and conforming generally to the frusto-conical shape of the bore of the insert.

References Cited in the file of this patent

UNITED STATES PATENTS

| Number | Name | Date |
|---|---|---|
| 200,496 | Willoughby | Feb. 19, 1878 |
| 561,441 | Schmidt | June 2, 1896 |
| 1,056,811 | McElroy | Mar. 25, 1913 |
| 1,926,197 | Durr | Sept. 12, 1933 |
| 2,025,067 | Miller | Dec. 24, 1935 |
| 2,507,536 | Goodson | May 16, 1950 |

FOREIGN PATENTS

| Number | Country | Date |
|---|---|---|
| 23,007 | Great Britain | Aug. 31, 1911 |